United States Patent
Kneckt et al.

(10) Patent No.: US 8,462,644 B2
(45) Date of Patent: Jun. 11, 2013

(54) AD HOC NETWORK INITIATION

(75) Inventors: Jarkko Kneckt, Espoo (FI); Mika Kasslin, Espoo (FI); Janne Marin, Espoo (FI)

(73) Assignee: Nokia Corporation, Espoo (FI)

( * ) Notice: Subject to any disclaimer, the term of this patent is extended or adjusted under 35 U.S.C. 154(b) by 426 days.

(21) Appl. No.: 12/346,320

(22) Filed: Dec. 30, 2008

(65) Prior Publication Data

US 2010/0165875 A1 Jul. 1, 2010

(51) Int. Cl.
*G08C 15/00* (2006.01)
*H04L 12/28* (2006.01)
*H04L 12/56* (2006.01)

(52) U.S. Cl.
USPC .............. 370/252; 370/254; 370/395.21

(58) Field of Classification Search
None
See application file for complete search history.

(56) References Cited

U.S. PATENT DOCUMENTS

| | | | |
|---|---|---|---|
| 2006/0239208 A1* | 10/2006 | Roberts et al. | 370/254 |
| 2007/0002783 A1 | 1/2007 | Krantz et al. | |
| 2007/0073914 A1 | 3/2007 | Yoshida | |
| 2008/0013496 A1* | 1/2008 | Dalmases et al. | 370/336 |
| 2008/0031208 A1* | 2/2008 | Abhishek et al. | 370/338 |
| 2008/0037444 A1* | 2/2008 | Chhabra | 370/254 |
| 2008/0089300 A1* | 4/2008 | Yee | 370/338 |
| 2008/0298333 A1* | 12/2008 | Seok | 370/338 |
| 2008/0299909 A1* | 12/2008 | Sakai | 455/66.1 |

FOREIGN PATENT DOCUMENTS

WO WO2007094183 8/2007

OTHER PUBLICATIONS

IEEE Std 802.11-2007, "IEEE Standard for Information Technology—telecommunications and information exchange between systems—Local and metropolitan area networks—specific requirements. Part 11: Wireless LAN Medium Access Control (MAC) and Physical Layer (PHY) Specifications," Jun. 12, 2007.
International Search Report for International Application No. PCT/IB2009/055599 dated Sep. 4, 2010.

* cited by examiner

*Primary Examiner* — Otis L Thompson, Jr.
*Assistant Examiner* — Ashley Shivers
(74) *Attorney, Agent, or Firm* — Locke Lord LLP

(57) ABSTRACT

Method, apparatus, and computer program product embodiments are disclosed to improve network performance for ad hoc network initiation. Example embodiments include a new operational sequence for wireless devices initiating the use of an ad hoc network. The example embodiments require appropriately enabled wireless devices to only respond to probe request frames from other similarly appropriately enabled wireless devices. In this manner, two devices may avoid the time consuming effort of combining two different ad hoc networks into a single ad hoc network so that the two devices can communicate.

21 Claims, 8 Drawing Sheets

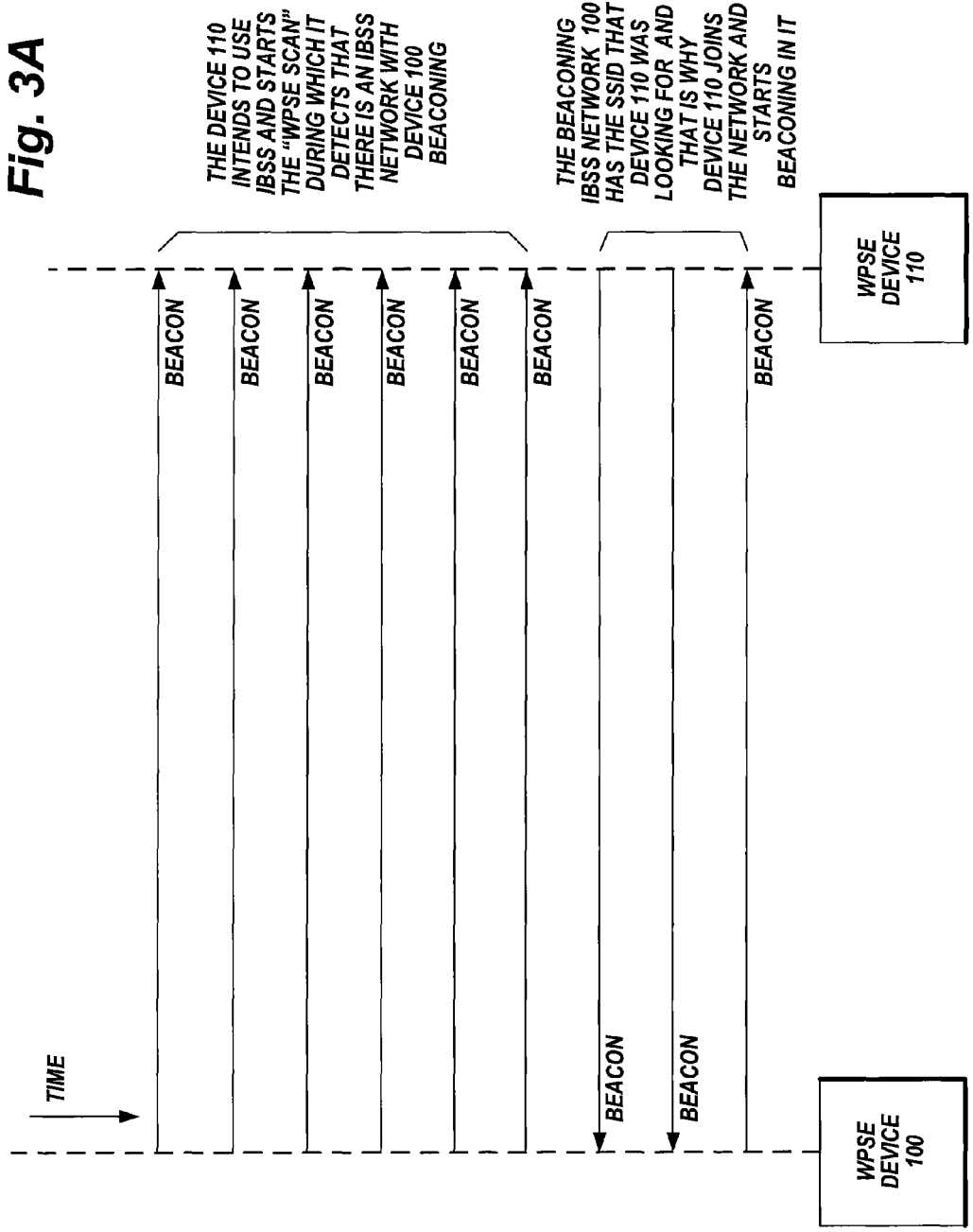

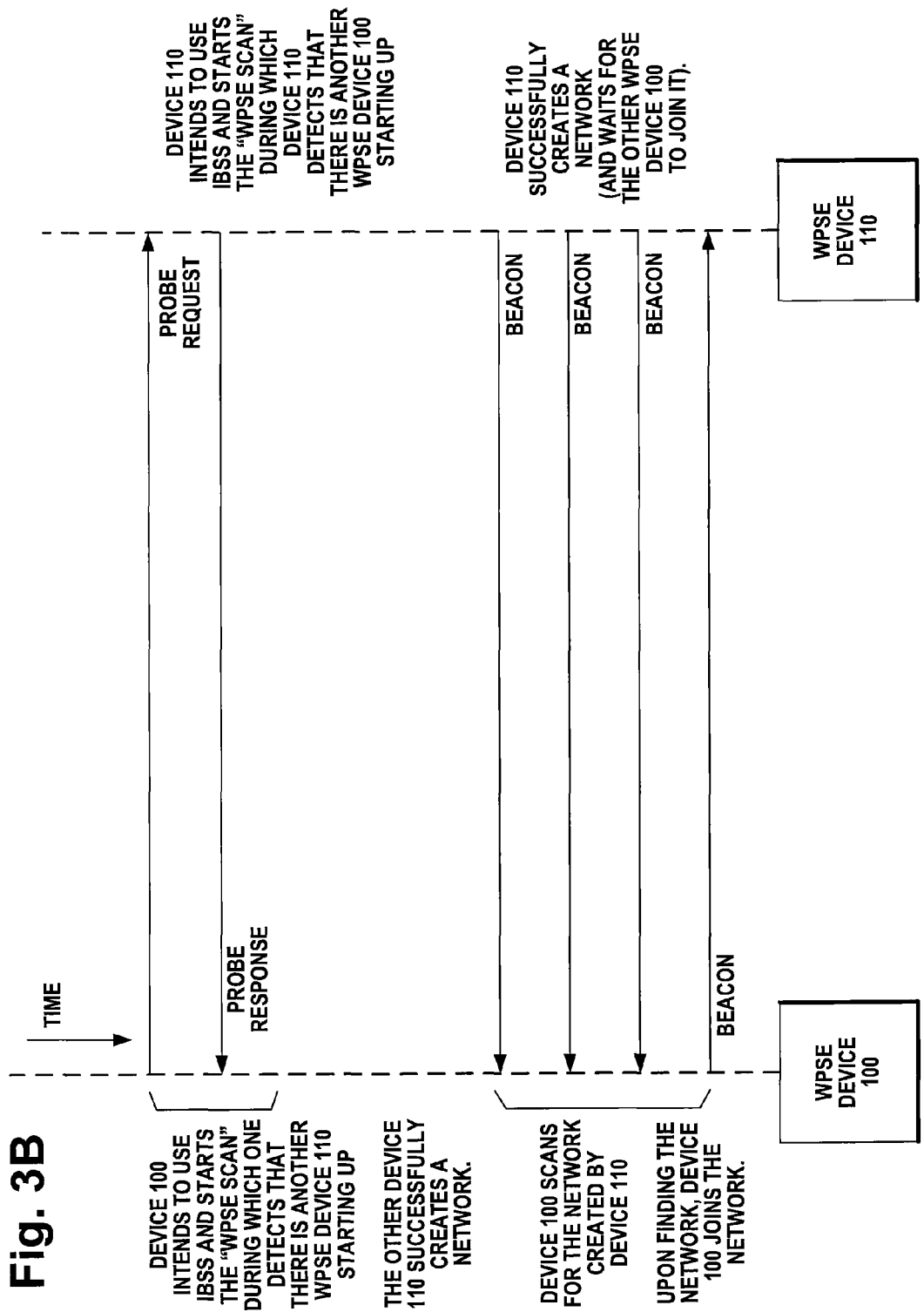

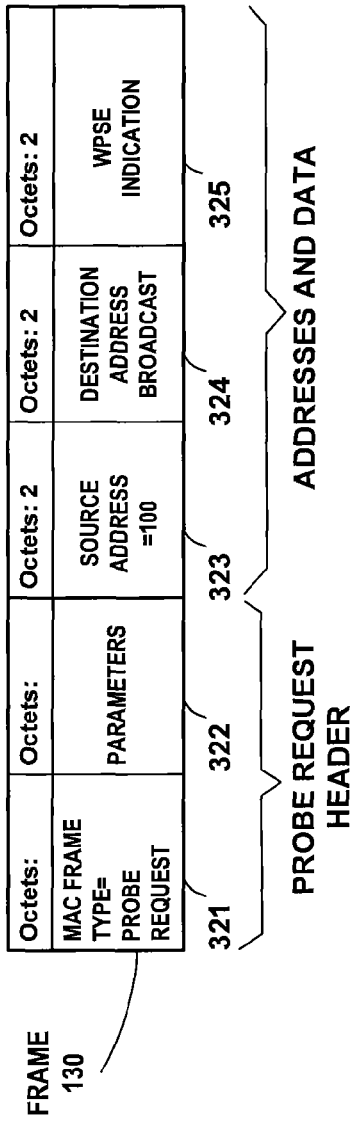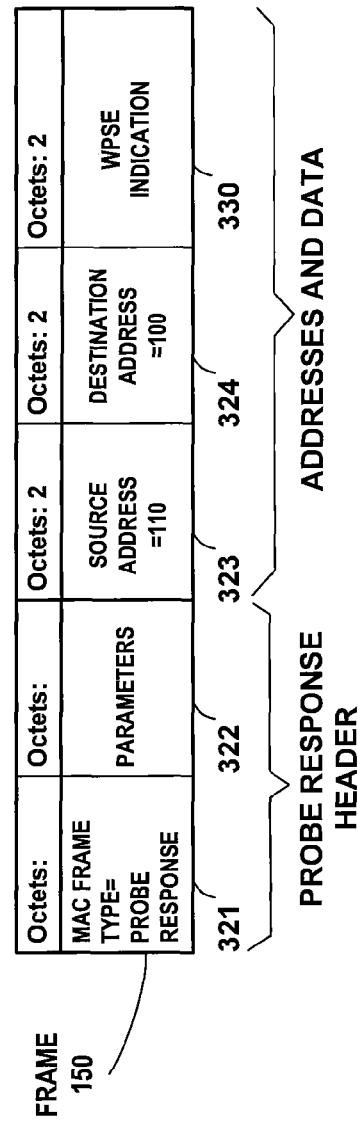

AD HOC NETWORK INITIATION

FIELD

The embodiments relate to wireless communication, and more particularly to an enhanced network initiation procedure for wireless devices creating ad hoc networks.

BACKGROUND

Modern society has quickly adopted, and become reliant upon, handheld devices for wireless communication. For example, cellular telephones continue to proliferate in the global marketplace due to technological improvements in both the communication quality and device functionality. These wireless communication devices have become common for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate wireless communication over large geographic areas. These network technologies have commonly been divided by generations, starting in the late 1970s to early 1980s with first generation (1G) analog cellular telephones that provided baseline voice communication, to modern digital cellular telephones. Global System for Mobile Communications (GSM) is an example of a widely employed 2G digital cellular network communicating in the 900 MHz/1.8 GHz bands in Europe and at 850 MHz and 1.9 GHz in the United States. This network provides voice communication and also supports the transmission of textual data via the Short Messaging Service (SMS). SMS allows a wireless communications device (WCD) to transmit and receive text messages of up to 160 characters, while providing data transfer to packet networks, Integrated Services Digital Network (ISDN) and Plain Old Telephone Service (POTS) users at 9.6 Kbps. The Multimedia Messaging Service (MMS), an enhanced messaging system allowing for the transmission of sound, graphics and video files in addition to simple text, has also become available in certain devices. Soon, emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. In addition to Bluetooth™, other popular short-range wireless networks include for example IEEE 802.11 Wireless LAN, Wireless Universal Serial Bus (WUSB), Ultra Wideband (UWB), ZigBee (IEEE 802.15.4 and IEEE 802.15.4a), wherein each of these exemplary wireless mediums have features and advantages that make them appropriate for various applications The IEEE 802.11 Wireless LAN is a popular short-range wireless network. The IEEE 802.11 Wireless LAN Standard defines a medium access control (MAC) specification and includes several physical layers (PHY) that specify the over-the-air modulation techniques that all use the same basic MAC protocol. The OFDM PHY for the 5 GHz band (formerly known as the 802.11a standard) uses orthogonal frequency-division multiplexing (OFDM) with a maximum data rate of 54 Mbit/s. The DSSS PHY for the 2.4 GHz band (formerly known as the 802.11b standard) uses direct sequence spread spectrum (DSSS) modulation to deliver up to 11 Mbps data rates. The ERP PHY (formerly known as the 802.11g standard) uses the 2.4 GHz band, and builds on top of the DSSS PHY providing data rates up to 54 Mbps with OFDM based modes similar to the ones in the OFDM PHY for the 5 GHz band. The radiation pattern for devices using these PHYs is omnidirectional, wherein power is radiated uniformly in a plane.

The IEEE 802.11 Wireless LAN Standards describe two major components, a wireless device, called a station (STA), and an access point (AP) wireless device. The AP may perform the wireless-to-wired bridging from STAs to a wired network. The basic network is the basic service set (BSS), which is a group of wireless devices that communicate with each other. An infrastructure BSS is a network that has an AP as an essential node.

IEEE 802.11 medium access control (MAC) protocol regulates access to the RF physical link. The MAC provides a basic access mechanism with clear channel assessment, channel synchronization, and collision avoidance using the Carrier sense Multiple Access (CSMA) principle. It also provides network inquiring, which is an inquiry and scan operation. The MAC provides data fragmentation, authentication, encryption, and power management.

Synchronization is the process of the stations in an IEEE 802.11 network getting in step with each other, so that reliable communication is possible. The MAC provides the synchronization mechanism to allow support of physical layers that make use of frequency hopping or other time-based mechanisms where the parameters of the physical layer change with time. The process involves beaconing to announce the presence of a network and inquiring to find a network. Once a network is found, a station joins the network.

An IEEE 802.11 ad hoc network is referred to as an independent BSS (IBSS). In an IEEE 802.11 ad hoc network, there is no access point (AP) to act as the central time source for the ad hoc network. The IBSS is the most basic type of IEEE 802.11 LAN, a minimum IEEE 802.11 LAN may consist of only two STAs. The BSSID field of a MAC uniquely identifies each BSS. The value of this field in an IBSS is a random number used to provide a high probability of selecting a unique BSSID. In addition, the service set identifier (SSID) indicates the identity of an IBSS, as a network ID unique to a network. Only stations that share the same SSID and BSSID are able to communicate with each other.

Since there is no AP, the mobile station that starts the ad hoc network will begin by transmitting a Beacon, selecting a unique BSSID and choosing a beacon period. This establishes the basic beaconing process for this ad hoc network. After the ad hoc network has been established, each station in the ad hoc network will attempt to send a Beacon after the target beacon transmission time arrives. To minimize actual collisions of the transmitted Beacon frames on the medium, each station in the ad hoc network will choose a random delay value, which it will allow to expire before it attempts its Beacon transmission. If the station receives a beacon from another station in the network when waiting for the delay to expire, it will not transmit its own beacon.

In order for a station to communicate with other stations in a wireless network, it must first find the other stations. The process of finding another station may involve either passive scanning or active scanning. Passive scanning involves only listening for example for IEEE 802.11 traffic. Active scanning requires the inquiring station to transmit and invoke responses from IEEE 802.11 stations with probe request frames.

SUMMARY

Method, apparatus, and computer program product embodiments are disclosed to improve network performance for ad hoc network initiation. An example embodiment may include steps of receiving at a wireless device that is in an operation mode for setting up an ad hoc network, a wireless message from another device; determining from the received message if the other device is actively setting up an ad hoc network; ignoring the message if the other device is not actively setting up an ad hoc network; and responding to the message if the other device is actively setting up an ad hoc network. An example embodiment may further include steps of indicating in the response that it is from a responding wireless device that is in an operation mode for setting up an ad hoc network. The indicating may include adding a predefined value as an ad hoc network identifier. An example embodiment may further include analyzing, at the wireless device, information of the received message and comparing it to information regarding the wireless device, and determining whether the other device or the wireless device will start a new network for initiating ad hoc network communication between the devices. An example embodiment may further include the received wireless message being a probe request message and the response being a probe response message. An example embodiment may further include a step of starting a new network by the responding device as a response to the message and enabling the other device to join the new network. Alternately, an example embodiment may further include a step of joining a new network started by the other device as a response to the message.

Another example embodiment may include steps of transmitting by a first wireless device, a wireless message indicating the transmitting device is actively setting up an ad hoc network; receiving a wireless response from a responding device; and ignoring the response if it indicates that the responding device is not a wireless device that is in an operation mode for setting up an ad hoc network. An example embodiment may further include steps of analyzing information in the response and comparing it to information regarding the first wireless device if the response includes an indication that the responding device is a wireless device that is in an operation mode for setting up an ad hoc network, and determining whether the first device or the responding device will start a new network for communication between the first and responding devices. An example embodiment may further include the indication including adding a predefined value as ad hoc network identifier. An example embodiment may further include the transmitted wireless message being a probe request message and the response being a probe response message.

Another example embodiment may be an apparatus including a transceiver in the apparatus that is in an operation mode for setting up an ad hoc network, configured to receive a wireless message from another device; a processor in the apparatus, configured to determine from the message if the other device is actively setting up an ad hoc network; the processor further configured to ignore the message if the other device is not actively setting up an ad hoc network; and the transceiver further configured to respond to the message if the other device is actively setting up an ad hoc network. An example embodiment may further include the transceiver further configured to transmit a wireless response to the other device; and the processor further configured to indicate in the response that it is from a responding wireless device that is in an operation mode for setting up an ad hoc network. An example embodiment may further include the indicating including adding a predefined value as an ad hoc network identifier. An example embodiment may further include the processor further configured to analyze information of the received message and compare it to information regarding the apparatus; and the processor further configured to determine whether the other device or the apparatus will start a new network for initiating ad hoc network communication between the other device and the apparatus. An example embodiment may further include the received wireless message being a probe request message and the response being a probe response message. An example embodiment may further include the processor further configured to join a new network started by the first device as a response to the message.

Another example embodiment may be an apparatus including a transceiver configured to transmit a wireless message indicating the apparatus is actively setting up an ad hoc network; the transceiver further configured to receive a wireless response from a responding device; and a processor in the apparatus, configured to ignore the response if it indicates that the responding device is not a wireless device that is in an operation mode for setting up an ad hoc network. An example embodiment may further include the processor further configured to analyze information in the response and comparing it to information regarding the apparatus if the response includes an indication that the responding device is a wireless device that is in an operation mode for setting up an ad hoc network; and the processor further configured to determine whether the apparatus or the responding device will start a new network for communication between the apparatus and the responding device. An example embodiment may further include the indication including adding a predefined value as ad hoc network identifier. An example embodiment may further include the transmitted wireless message being a probe request message and the response being a probe response message. An example embodiment may further include the processor further configured to join a new network started by the responding device based on the response.

Another example embodiment may be a computer readable medium configured to store program instructions, which when executed by a computer processor, perform the steps of receiving at a wireless device that is in an operation mode for setting up an ad hoc network, a wireless message from another device; determining from the received message if the other device is actively setting up an ad hoc network; ignoring the message if the other device is not actively setting up an ad hoc network; and responding to the message if the other device is actively setting up an ad hoc network. An example embodiment may further include steps of indicating in the response that it is from a responding wireless device that is in an operation mode for setting up an ad hoc network. The indicating may include adding a predefined value as an ad hoc network identifier. An example embodiment may further include analyzing, at the wireless device, information of the received message and comparing it to information regarding the wireless device, and determining whether the other device or the wireless device will start a new network for initiating ad hoc network communication between the devices. An example embodiment may further include the received wireless message being a probe request message and the response being a probe response message. An example embodiment may further include a step of starting a new network by the responding device as a response to the message and enabling the other device to join the new network. Alternately, an example embodiment may further include a step of joining a new network started by the other device as a response to the message.

Another example embodiment may be a computer readable medium configured to store program instructions, which when executed by a computer processor, perform the steps of: transmitting by a first wireless device, a wireless message indicating the transmitting device is actively setting up an ad hoc network; receiving a wireless response from a responding device; and ignoring the response if it indicates that the responding device is not a wireless device that is in an operation mode for setting up an ad hoc network. An example embodiment may further include steps of analyzing information in the response and comparing it to information regarding the first wireless device if the response includes an indication that the responding device is a wireless device that is in an operation mode for setting up an ad hoc network, and determining whether the first device or the responding device will start a new network for communication between the first and responding devices. An example embodiment may further include the indication including adding a predefined value as ad hoc network identifier. An example embodiment may further include the transmitted wireless message being a probe request message and the response being a probe response message. An example embodiment may further include program instructions, which when executed by a computer processor, perform the step of: starting a new network by the first device and enabling the responding device to join the new network. An alternate example embodiment may further include program instructions, which when executed by a computer processor, perform the step of: joining a new network started by the responding device based on the response.

In this manner, the two devices may avoid the time consuming effort of combining two different ad hoc networks into a single ad hoc network so that the two devices can communicate.

DESCRIPTION OF THE FIGURES

FIG. 3A is an example signal timing diagram of a "WPSE scan" enabled wireless device detecting a beaconing IBSS network and joining it.

FIG. 3B is an example signal timing diagram of a "WPSE scan" enabled wireless device in the case where two devices find each other during a "WPSE scan" and create a single, joint IBSS network.

FIG. 4A is an example illustration of a probe request frame with an indication that its sender is a "WPSE scan" enabled device according to at least one embodiment.

FIG. 4B is an example illustration of a probe response frame with an indication that its sender is a "WPSE scan" enabled device according to at least one embodiment.

DISCUSSION OF EXAMPLE EMBODIMENTS

Figure 1A:
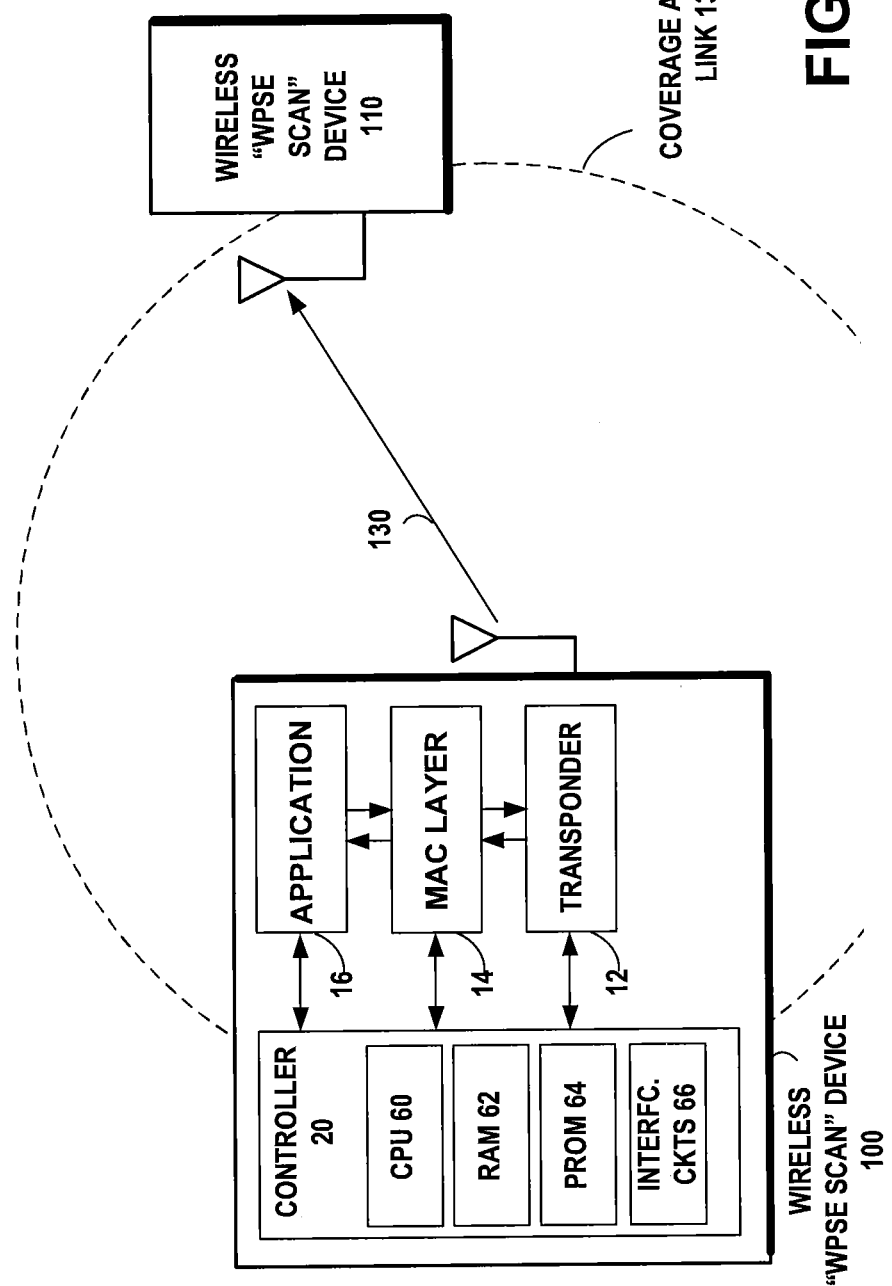
FIG. 1A illustrates an external view and a functional block diagram of an example embodiment of two "WPSE scan" enabled wireless devices before forming an ad hoc network, with a first device transmitting a probe request.

While the present invention has been described herein in terms of a multitude of example embodiments, various changes or alterations can be made therein without departing from the spirit and scope of the present invention, as set forth in the appended claims.

A conventional mechanism to start using an ad hoc network, such as, for example an independent BSS (IBSS) in connection with WLAN networks, consists typically of the following steps:

1. Scan available networks at the area (no beaconing and no probe response transmissions)
2a. if a desired (typically as per the SSID) network was found, join the network
2b. if not, create a new network by starting to beacon During the scan operation, the devices get information of the available networks only if the networks already exist, i.e. if a network has a device that transmits beacons and responds to probe request frames.

However, it is typical that the network creation starts upon some user action. There may be a push button in the devices that the user has to press to initiate connection setup. In an example case, this happens in both devices when two or more users decide to establish a connection between the devices to share data and/or initiate a communication session. In many cases, this happens in both devices almost simultaneously, since two users e.g. in a meeting wish to begin a data exchange between their devices.

If the button activation happens at approximately the same time in the two devices, they both may end up in creating two separate ad hoc networks, since both devices are operating with the same rules as per forthcoming WPSE specification. The acronym "WPSE" is for Wi-Fi Protected Setup Extensions. Both devices may create a new IBSS network with same SSID, but with different BSSIDs. In practice the two devices do not operate in the same network, and they may not exchange data with each other. Merging two networks takes time and results typically in a poor user experience.

This example problem, among other problems, may be solved with method, apparatus, and computer program product embodiments disclosed herein, which improve network performance for ad hoc WLANs. Example embodiments include a new operational sequence for WLAN devices initiating the use of an ad hoc, IBSS network. The example embodiments require appropriately enabled WLAN devices to only respond to probe request frames from other similarly enabled WLAN devices. The enablement is referred to herein as "WPSE scan" enablement, wherein the enabled wireless device is in an operation mode for setting up an ad hoc network.

Example embodiments include a new operational sequence for wireless devices, such as, for example WLAN devices initiating the use of an ad hoc, IBSS network. The example embodiments require appropriately enabled WLAN devices to respond to probe request frames only from other similarly enabled WLAN devices. The enablement is referred to herein as "WPSE scan" enablement, wherein the enabled wireless device is in an operation mode for setting up an ad hoc network. The acronym "WPSE" is for Wi-Fi Protected Setup Extensions. First devices equipped with "WPSE scan" enablement transmit probe request frames identifying that the sending device is "WPSE scan" enabled. Another device that is "WPSE scan" enabled, will not respond to probe requests that are not identified as "WPSE scan" enabled. However, when a device is "WPSE scan" enabled and receives beacon frames identifying that the sending device represents an IBSS network the scanning device is looking for, it may join the IBSS network of the sending device.

According to at least one embodiment, if the first device wishes to join an ad hoc network, it transmits probe request frames identifying that the first device is "WPSE scan" enabled, i.e. the device is in an operation mode for setting up an ad hoc network. Another device that is similarly "WPSE scan" enabled will not respond to probe requests that are not identified as "WPSE scan" enabled. However, when the other device is "WPSE scan" enabled and receives probe request frames identifying that the first device is "WPSE scan" enabled, and it may respond with a probe response frame. The probe response from the responding device may identify that the responding device is "WPSE scan" enabled. In one example embodiment, the first device analyzes the probe response frame and compares the received MAC address of the responder with that of the first device. Similarly, the responding device analyzes the probe request frame and compares the received MAC address of the first device with that of the responding device. By convention, either the larger or the smaller of the MAC address values may designate its identified device as the designated device of the pair for starting a single IBSS network. The other device may then join the single IBSS network. This may happen if either of the devices do not detect any proper IBSS network beaconing. In another example embodiment, if either of the devices determine during the scan that there is an existing, proper IBSS network (i.e., the SSID matches), the device may rather join that network instead of creating a new one.

The "WPSE scan" enabled operation mode is similar in both devices. Both transmit probe requests and probe responses upon receiving a probe request from another similar device. They both may also analyze beacons from ad hoc networks and if the network is considered appropriate, the receiving device joins the network instead of starting a new one or joining a network created by some other "WPSE scan" device.

In this manner, the two devices may avoid the time consuming effort of combining two different IBSS networks into a single IBSS network so that the two devices can communicate data.

In example embodiments, the "WPSE scan" enabled devices need to assign a specific value to the BSSID that represents all of the "WPSE scan" enabled devices. That BSSID value is set to a value indicative of "WPSE scan" enablement. The SSID can be still given a wildcard SSID or a specific SSID in scan commands and probe requests. If the wildcard SSID is used in the scan command, a "WPSE scan" enabled device will not respond to any probe request frames. A "WPSE scan" enabled device is responsible to respond all probe requests from devices running "WPSE scan" as long as all the criteria for sending a probe response are met.

In example embodiments, to ensure that the "WPSE scan" enabled device, i.e. a device that is in an operation mode for setting up an ad hoc network, does not respond to probe requests from devices running a legacy scan, the criteria for sending a probe response are as follows:

a) The SSID in the probe request is the wildcard SSID or the specific SSID, b) The BSSID field in the probe request frame is the BSSID indicative of "WPSE scan" enablement, and c) The destination address (DA) field in the probe request is the broadcast address or the specific MAC address of the device.

Upon completing the "WPSE scan" procedure the scanning device has a list of:

a) IBSS networks from which a beacon was received with SSID matching the SSID given in the "WPSE scan" command, and b) devices that were found to be running "WPSE scan" with SSID matching the SSID given in the "WPSE scan" command devices from which a probe response was detected with BSSID set to the value indicative of "WPSE scan"

devices from which a probe request was received with a specific SSID and to which a probe response was transmitted both with the BSSID set to the value indicative of "WPSE scan"

If a proper beaconing IBSS network was found, the device may join the network instead of starting a new one. If that is not the case, but the list contains devices running the "WPSE scan", a new IBSS network may be formed. The new network may be created by the device with the smallest (or the largest) MAC address from the device list from the "WPSE scan" compared with the scanner's own MAC address. If the scanning device has a smaller (or a larger) MAC address than any of the devices it found in the "WPSE scan", it may create an IBSS network with the specific SSID and BSSID. In all the other cases (i.e. if a device with smaller/larger MAC address was found) the device may wait for the other device to create the IBSS network and then it may join the other network upon finding it with a normal scan.

To summarize, according to at least one embodiment after the "WPSE scan" the device may either:

a) Join the existing IBSS network that was found sending its beacons, b) Create an IBSS network and wait for other devices to join (if the device has the smallest/largest MAC address), or c) First scan to discover an IBSS network created by one of the other devices found in "WPSE scan" and then join to the network.

Figure 1B:
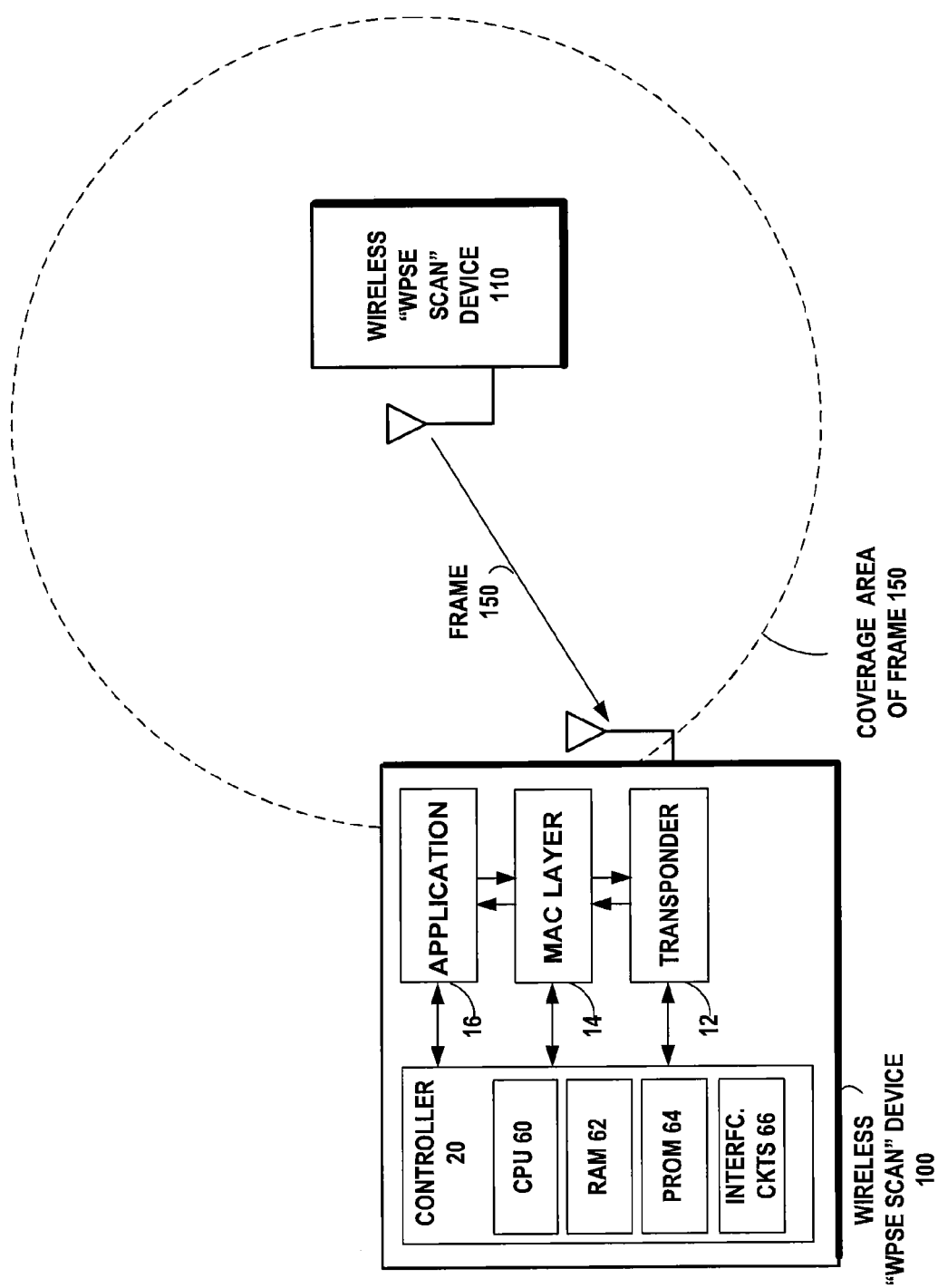
FIG. 1B illustrates the external view and functional block diagram of FIG. 1A, wherein the second wireless device responds to a probe request with a probe response.

FIG. 1A shows the "WPSE scan" enabled wireless devices 100 and 110, before forming an ad hoc network. An example probe request frame 130 sent by device 100 is shown in FIG. 4A, with an indication that it is from a "WPSE scan" enabled wireless device according to at least one embodiment. FIG. 1B illustrates the external view and functional block diagram of FIG. 1A, wherein the second "WPSE scan" enabled wireless device 110 responds with a probe response frame 150. The example probe response frame 150 is shown in FIG. 4B, with an indication that it is from a "WPSE scan" enabled wireless device according to at least one embodiment.

FIG. 1A illustrates the first device 100 transmitting a probe request 130, identifying that the sending device 100 as "WPSE scan" enabled according to at least one embodiment. Another device, for example device 110, is "WPSE scan" enabled and is in shown in FIG. 1A. Device 110 may be programmed to not respond probe requests that are not identified as "WPSE scan" enabled. However, when the device 110 receives beacon frames from a proper existing IBSS network, the device 110 may join the IBSS network of the sending device 100. If a sending device 100 is beaconing, it is representing a network and normal rules should apply then.

Figure 2A:
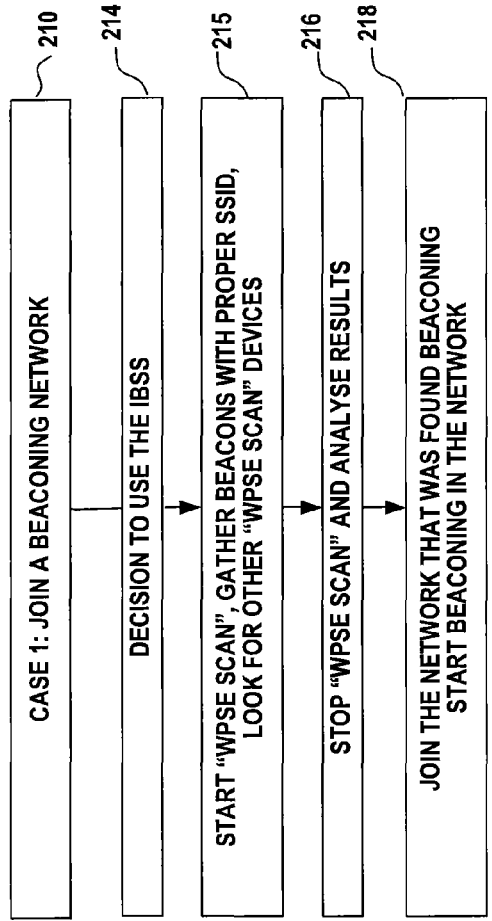
FIGS. 2A, 2A', 2B, and 2C are flow diagrams of an example embodiment for the wireless device initiating network operations in example cases.
Figure 2A:
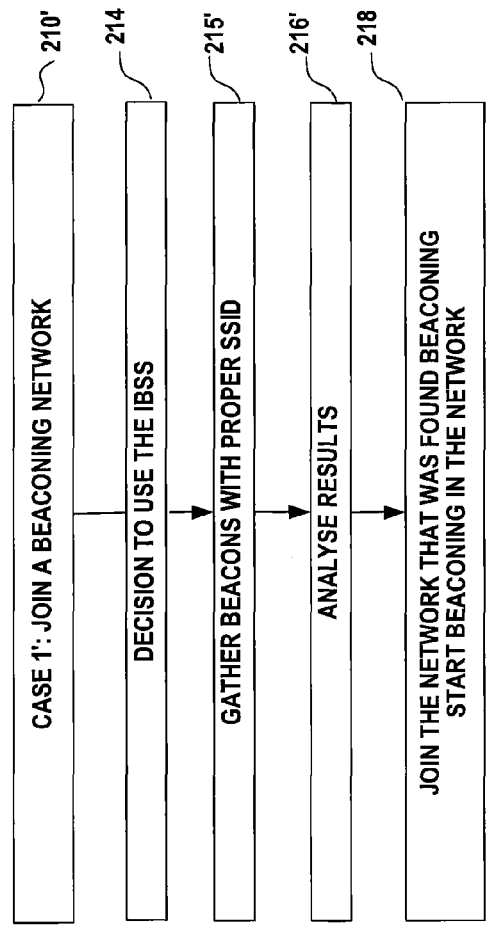

FIG. 2A is a flow diagram 210 of an example embodiment for the wireless device 110 joining an existing network, where it is not initially detected that there is an existing network in the area. In Step 214, device 110 decides to use IBSS. In step 215, device 110 starts a "WPSE" scan", gathers beacons with the proper SSID, and looks for other "WPSE scan" devices. In step 216, device 110 stops the "WPSE" scan" and analyzes the results. In step 218, device 110 joins the network with device 100 that was found beaconing. Device 110 then starts beaconing in the network.

FIG. 2A' is a flow diagram 210' of an example embodiment for the wireless device 110 joining an existing network, where it is initially detected that there is an existing, desirable network in the area. In Step 214, device 110 decides to use IBSS. In step 215', device 110 gathers beacons with the proper SSID, such as device 100. In step 216', device 110 analyzes the results. In step 218, device 110 joins the network of device 100 that was found beaconing. Device 110 then starts beaconing in the network. FIG. 2A' represents the circumstance where there in no need device 110 to send "WPSE" scan" probe requests, since it is initially detected from the received beacons that the desired device 100 has already established a network that may be joined.

FIG. 3A is an example signal timing diagram of a "WPSE scan" enabled wireless device 110, which intends to use IBSS and starts the "WPSE scan" according to at least one embodiment. Device 110 detects a beaconing IBSS network with device 100. The beacons indicate that the beaconing IBSS network 100 has the SSID that device 110 was seeking. Thus, device 110 joins the network of device 100 and starts beaconing in it.

Alternately, if the first device 100 wishes to join an ad hoc network, it transmits probe request frames 130 identifying that the first device 100 is "WPSE scan" enabled. Another device, such as device 110, which is "WPSE scan" enabled, will not respond to probe requests that are not identified as "WPSE scan" enabled.

However, when the "WPSE scan" enabled device 110 receives probe request frames 130 identifying that the first device 100 is "WPSE scan" enabled, it may respond with a probe response frame 150, as shown in FIG. 1B. The probe response 150 may identify that the responding device 110 is "WPSE scan" enabled.

The first device 100 may analyze the probe response frame 150 and compare the received MAC address of the responding device 110 with that of the first device 100. Similarly, the responding device 110 may analyze the probe request frame 130 and compare the received MAC address of the first device 100 with that of the responding device 110. By convention, either the larger or the smaller of the MAC address values may designate its identified device as the designated device of the pair for starting a single IBSS network. The other device of the pair may then join the single, resulting IBSS network.

In this manner, the two devices 100 and 110 may avoid the time consuming effort of combining two different IBSS networks into a single IBSS network so that the two devices can communicate data.

Figure 2B:
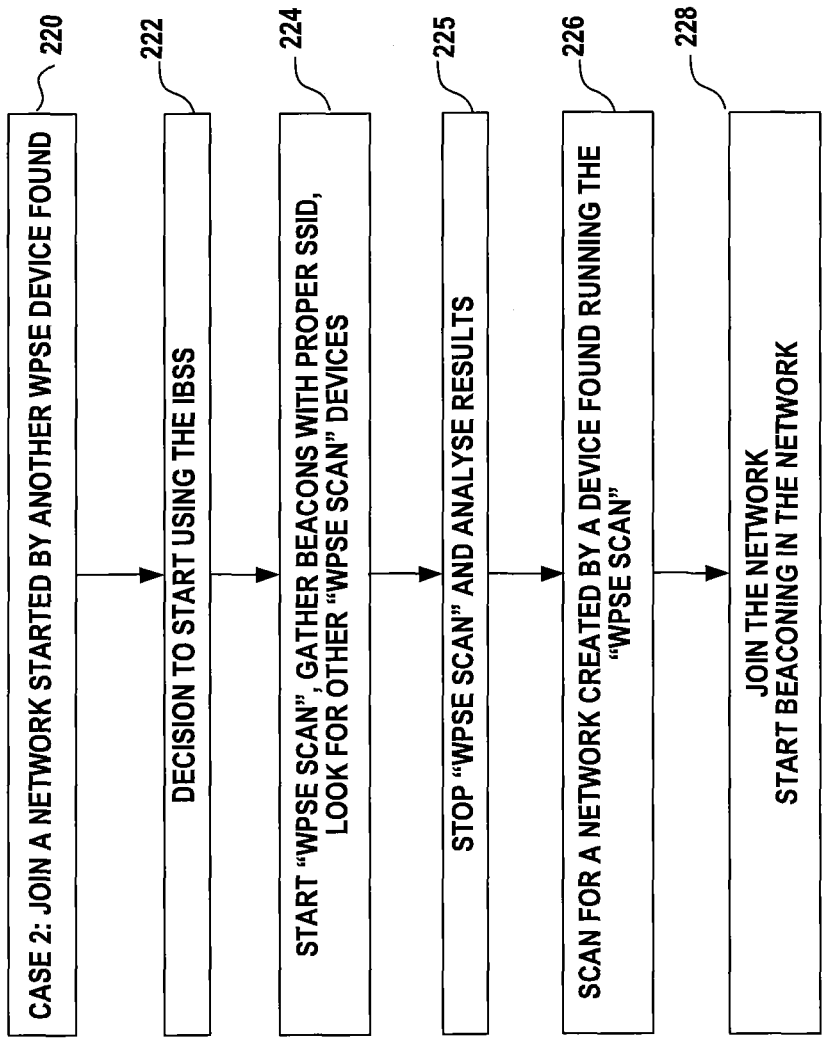

FIG. 2B is a flow diagram 220 of an example embodiment for the wireless device 110 joining a network started by another device. In Step 222, device 110 decides to use IBSS. In step 224, device 110 starts a "WPSE" scan" operation mode, gathers beacons with the proper SSID, and looks for other "WPSE scan" devices, such as device 100. In step 225, device 110 stops the "WPSE" scan" and analyzes the results. In step 226, device 110 scans for a network created by a device 100 found running the "WPSE scan". In step 228, device 110 joins the network with device 100. Device 110 then starts beaconing in the network.

FIG. 3B is an example signal timing diagram of a "WPSE scan" enabled wireless device 110, which intends to use IBSS and starts a "WPSE scan" operation mode according to at least one embodiment. At approximately the same time, "WPSE scan" enabled wireless device 100 starts a "WPSE scan". Device 110 detects the probe request from device 100 and replies with a probe response. The probe request and the probe response indicate the SSID that each device was seeking. Both device 100 and device 110 compare their respective MAC addresses and, by convention, device 110 starts an IBSS network and waits for device 100 to join it.

Figure 2C:
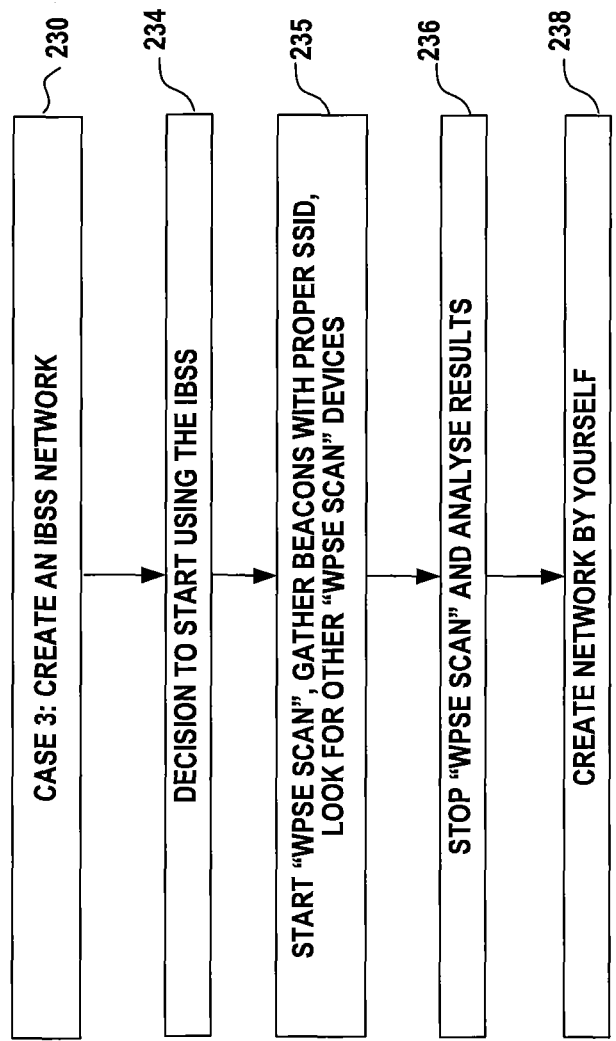

FIG. 2C is a flow diagram 230 of an example embodiment for the wireless device 110 creating an IBSS network. In Step 234, device 110 decides to use IBSS. In step 235, device 110 starts a "WPSE" scan", gathers beacons with the proper SSID, and looks for other "WPSE scan" devices, such as device 100. In step 236, device 110 stops the "WPSE" scan" and analyzes the results. In step 238, device 110 creates its own IBSS network.

In example embodiments, the "WPSE scan" enabled devices need to assign a specific value to the BSSID that represents all of the "WPSE scan" enabled devices. That BSSID value is set to a value indicative of "WPSE scan" enablement. The SSID can be still given a wildcard SSID or a specific SSID in scan commands and probe requests. If the wildcard SSID is used in the scan command, a "WPSE scan" enabled device may not respond to any probe request frames. A "WPSE scan" enabled device is responsible to respond all probe requests from devices running "WPSE scan" as long as all the criteria for sending a probe response are met.

In example embodiments, to ensure that the "WPSE scan" enabled device 110 does not respond to probe requests 130 from devices running a legacy scan that are not "WPSE scan" enabled, the criteria for sending a probe response 150 may be e.g. as follows:

a) The SSID in the probe request 130 is the wildcard SSID or the specific SSID, b) The BSSID field in the probe request frame 130 is the BSSID indicative of "WPSE scan" enablement, and c) The destination address (DA) field in the probe request 130 is the broadcast address or the specific MAC address of the device 110.

Upon completing the "WPSE scan" procedure the scanning device 110 has a list of:

a) IBSS networks with devices 100 from which a beacon was received with SSID matching the SSID given in the "WPSE scan" command, and b) devices 100 that were found to be running "WPSE scan" with SSID matching the SSID given in the "WPSE scan" command devices from which a probe response 150 was detected with BSSID set to the value indicative of "WPSE scan"

devices from which a probe request 130 was received with a specific SSID and to which a probe response 150 was transmitted both with the BSSID set to the value indicative of "WPSE scan"

If a proper beaconing IBSS network was found, the device 110 may join the network instead of starting a new one.

If that is not the case, but the list contains devices 100 running the "WPSE scan", a new IBSS network may be formed. The new network may be created by the device with the smallest (or the largest) MAC address from the device list from the "WPSE scan" compared with the scanner's own MAC address. According to at least one embodiment, if the scanning device has a smaller (or a larger) MAC address than any of the devices it found in the "WPSE scan", it may create an IBSS network with the specific SSID and BSSID. In other cases (i.e. if a device with smaller/larger MAC address was found) the device may wait for the other device to create the IBSS network and then it may join the other network upon finding it with a normal scan.

To summarize, after the "WPSE scan" the device 110 may either:

a) Join the existing IBSS network that was found with device 100 sending its beacons, b) Create an IBSS network and wait for other devices to join (if the device 110 has the smallest/largest MAC address), or c) First scan to discover an IBSS network created by one of the other devices 100 found in "WPSE scan" and then join to the network.

FIG. 1A illustrates an external view and a functional block diagram of an example embodiment of two "WPSE scan" enabled wireless devices 100 and 110 prior to forming an ad hoc network, with a first device transmitting a probe request. The wireless devices 100 and 110 can be a mobile communications device, PDA, cell phone, laptop or palmtop computer, or the like. The wireless devices 100 and 110 may also be an integrated component of a vehicle, such as an automobile, bicycle, airplane or other mobile conveyance.

Both wireless devices 100 and 110 may have the same type components. The wireless device 100 includes a control module 20, which includes a central processing unit (CPU) 60, a random access memory (RAM) 62, a read only memory (ROM) or programmable read only memory (PROM) 64, and interface circuits 66 to interface with a key pad, display, optional microphone, speakers, ear pieces, and camera or other imaging devices, etc. The RAM 62 and PROM 64 can be removable memory devices such as smart cards, Subscriber Identity Modules (SIMs), Wireless Application Protocol Identity Modules (WIMs), semiconductor memories such as a RAM, ROM, or PROM, flash memory devices, etc. The Medium Access Control (MAC) Layer 14 of the network protocol of the wireless device and/or application program 16 can be embodied as program logic stored in the RAM 62 and/or PROM 64 in the form of sequences of programmed instructions which can be executed in the CPU 60, carry out the functions of the disclosed embodiments. The program logic can be delivered to the writeable RAM, PROM, flash memory device, etc. 62 of the device 100 from a computer program product or article of manufacture in the form of computer-usable media such as resident memory devices, smart cards or other removable memory devices, or in the form of program logic transmitted over any transmitting medium which transmits such a program. Alternately, the MAC Layer 14 and/or application program 16 can be embodied as integrated circuit logic in the form of programmed logic arrays or custom designed application specific integrated circuits (ASIC). The transponder 12 in device 100 operates in accordance with the network protocol of the wireless device. The MAC layer 14 may operate using, for example the clause 17 PHY, clause 18 PHY or clause 19 PHY of the IEEE 802.11-2007 WLAN standard with an omnidirectional radiation pattern. It may also operate using the 60 GHz version of the IEEE 802.11 WLAN with a directional radiation pattern, for example the NGmS (next generation millimeter wave standard) or the VHT WLAN (very high throughput WLAN standard).

A few detailed implementation examples follow on the "WPSE scan" command and a BSSID value indicative of the "WPSE scan".

The "WPSE scan" devices may use a dedicated BSSID to indicate themselves in probe request and probe response frames. The BSSID field is a 48-bit field, which may have the same format as an IEEE 802 MAC address. The IEEE 802 MAC address format is specified in the IEEE 802 specification in a way that the two least significant bits (LSB) of the first octet of the address indicate whether the address is individual or group address (I/G address bit; I=0, G=1) and whether the address is universally allocated or locally allocated address (U/L address bit; U=0, L=1). In the IBSS case, the I/G bit is set to '0' and the U/L bit is set to '1' (i.e. individual address, locally allocated address). The rest of the bits in the IBSS field, i.e. 46 bits, should be randomly generated, as provided in the 802.11 specification, which reads "The remaining 46 bits of that MAC address shall be a number selected in a manner that minimizes the probability of STAs generating the same number, even when those STAs are subjected to the same initial conditions."

Embodiments use one specific value other than a wildcard value (i.e. all 1s) to indicate that the requesting/responding device is running the "WPSE scan". An example embodiment is to use the value of 0s for the 46 bits after the I/G and the U/L address bits. Any other value may also be acceptable, as long as the wildcard value is not used and as long as the I/G and U/L bit setting rules are respected.

The "WPSE scan" command may be an extension to the existing MLME-SCAN command, as provided in the 802.11 specification. Embodiments may use existing primitives, as provided in the 802.11 specification. Embodiments may also use a new valid parameter value ("WPSE") for the BSSType parameter in the MLME-SCAN.request primitive to indicate "WPSE scan". A new MLME primitive may be also specified.

An example embodiment may include steps of receiving at a wireless device that is in an operation mode for setting up an ad hoc network, a wireless message from another device; determining from the received message if the other device is actively setting up an ad hoc network; ignoring the message if the other device is not actively setting up an ad hoc network; and responding to the message if the other device is actively setting up an ad hoc network. An example embodiment may further include steps of transmitting a wireless response to the other device if the message is a probe request; indicating in the response that it is from a responding wireless device that is in an operation mode for setting up an ad hoc network; analyzing information in the probe request and comparing it to information in the response; and determining whether the other device or the responding device will start a new network for communication between the other and responding devices. An example embodiment may further include a step of starting a new network by the responding device as a response to the message and enabling the other device to join the new network. Alternately, an example embodiment may further include a step of joining a new network started by the other device as a response to the message. An example embodiment may further include the wireless device and the other device being "WPSE scan" enabled wireless devices.

Another example embodiment may include steps of transmitting by a first wireless device, a wireless message indicating the transmitting device is actively setting up an ad hoc network; receiving a wireless response from a responding device; and ignoring the response if it indicates that the responding device is not a wireless device that is in an operation mode for setting up an ad hoc network. An example embodiment may further include steps of receiving a probe response if the message is a probe request; determining in the probe response that the responding device is a wireless device that is in an operation mode for setting up an ad hoc network; analyzing information in the probe response and comparing it to information in the message; and determining whether the first device or the responding device will start a new network for communication between the first and responding devices. An example embodiment may further include a step of starting a new network by the first device and enabling the responding device to join the new network. Alternately, an example embodiment may further include a step of joining a new network started by the responding device based on the response. An example embodiment may further include the first wireless device and the responding device being "WPSE scan" enabled wireless devices.

Another example embodiment may be an apparatus including a transceiver in the apparatus that is in an operation mode for setting up an ad hoc network, configured to receive a wireless message from a first device; a processor in the apparatus, configured to determine from the message if the first device is actively setting up an ad hoc network; the processor further configured to ignore the message if the first device is not actively setting up an ad hoc network; and the transceiver further configured to respond to the message if the first device is actively setting up an ad hoc network. An example embodiment may further include the transceiver further configured to transmit a wireless response to the first device if the message is a probe request; the processor further configured to indicate in the response that it is from a responding wireless device that is in an operation mode for setting up an ad hoc network; the processor further configured to analyze information in the probe request and comparing it to information in the response; and the processor further configured to determine whether the first device or the apparatus will start a new network for communication between the first and responding devices. An example embodiment may further include the processor further configured to join a new network started by the first device as a response to the message. An example embodiment may further include the apparatus and the first device being "WPSE scan" enabled wireless devices.

Another example embodiment may be an apparatus including a transceiver configured to transmit a wireless message indicating the apparatus is actively setting up an ad hoc network; the transceiver further configured to receive a wireless response from a responding device; and a processor in the apparatus, configured to ignore the response if it indicates that the responding device is not a wireless device that is in an operation mode for setting up an ad hoc network. An example embodiment may further include the transceiver further configured to receive a probe response if the message is a probe request; the processor further configured to determine in the probe response that the responding device is a wireless device that is in an operation mode for setting up an ad hoc network; the processor further configured to analyze information in the probe response and comparing it to information in the message; and the processor further configured to determine whether the apparatus or the responding device will start a new network for communication between the apparatus and responding devices. An example embodiment may further include the processor further configured to join a new network started by the responding device based on the response. An example embodiment may further include the apparatus and the responding device being "WPSE scan" enabled wireless devices.

Another example embodiment may be a computer readable medium configured to store program instructions, which when executed by a computer processor, perform the steps of: receiving at a wireless device that is in an operation mode for setting up an ad hoc network, a wireless message from another device; determining from the received message if the other device is actively setting up an ad hoc network; ignoring the message if the other device is not actively setting up an ad hoc network; and responding to the message if the other device is "actively setting up an ad hoc network. An example embodiment may further include program instructions, which when executed by a computer processor, perform the steps of: transmitting a wireless response to the first device if the message is a probe request; indicating in the response that it is from a responding wireless device that is in an operation mode for setting up an ad hoc network; analyzing information in the probe request and comparing it to information in the response; and determining whether the first device or the responding device will start a new network for communication between the first and responding devices. An example embodiment may further include program instructions, which when executed by a computer processor, perform the step of: starting a new network by the responding device as a response to the message and enabling the first device to join the new network. An alternate example embodiment may further include program instructions, which when executed by a computer processor, perform the step of: joining a new network started by the first device as a response to the message. An example embodiment may further include the wireless device and the other device being "WPSE scan" enabled wireless devices.

Another example embodiment may be a computer readable medium configured to store program instructions, which when executed by a computer processor, perform the steps of: transmitting by a first wireless device, a wireless message indicating the transmitting device is actively setting up an ad hoc network; receiving a wireless response from a responding device; and ignoring the response if it indicates that the responding device is not a wireless device that is in an operation mode for setting up an ad hoc network. An example embodiment may further include program instructions, which when executed by a computer processor, perform the steps of: receiving a probe response if the message is a probe request; determining in the probe response that the responding device is a wireless device that is in an operation mode for setting up an ad hoc network; analyzing information in the probe response and comparing it to information in the message; and determining whether the first device or the responding device will start a new network for communication between the first and responding devices. An example embodiment may further include program instructions, which when executed by a computer processor, perform the step of: starting a new network by the first device and enabling the responding device to join the new network. An alternate example embodiment may further include program instructions, which when executed by a computer processor, perform the step of: joining a new network started by the responding device based on the response. An example embodiment may further include the first wireless device and the responding device being "WPSE scan" enabled wireless devices.

Another example embodiment may be an apparatus including means for receiving at a wireless device that is in an operation mode for setting up an ad hoc network, a wireless message from another device; means for determining from the received message if the other device is actively setting up an ad hoc network; means for ignoring the message if the other device is not actively setting up an ad hoc network; and means for responding to the message if the other device is "actively setting up an ad hoc network.

Another example embodiment may be an apparatus including means for transmitting by a first wireless device, a wireless message indicating the transmitting device is actively setting up an ad hoc network; means for receiving a wireless response from a responding device; and means for ignoring the response if it indicates that the responding device is not a wireless device that is in an operation mode for setting up an ad hoc network.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention. For instance, the features described herein may be employed in networks other than Wireless LAN networks.

What is claimed is:

1. A method, comprising:
   receiving, at a wireless device that is in an operation mode for setting up an ad hoc network, a wireless probe request message from another device;
   determining whether the another device is actively setting up an ad hoc network based on an indication included in the received probe request message;
   ignoring the probe request message if the another device is not actively setting up an ad hoc network; and
   responding to the probe request message by transmitting a probe response message if the another device is actively setting up an ad hoc network, as indicated by the indication in the probe request message, to enable the wireless device and the another device to determine which device will initiate ad hoc network communication between the devices.

2. The method of claim 1, further comprising:
   indicating in the response that it is from a responding wireless device that is in an operation mode for setting up an ad hoc network, based on an indication included in the probe response message.

3. The method of claim 2, wherein the indicating includes adding a predefined value as an ad hoc network identifier.

4. The method of claim 1, further comprising:
   analyzing, at the wireless device, information of the received probe request message and comparing it to information regarding the wireless device; and
   determining whether the another device or the wireless device will start a new network for initiating ad hoc network communication between the devices.

5. A method, comprising:
   transmitting by a first wireless device, a wireless probe request message indicating the transmitting device is actively setting up an ad hoc network, based on an indication included in the probe request message;
   receiving a wireless probe response message from a responding device;
   determining whether the responding device is actively setting up an ad hoc network based on an indication included in the received probe response message;
   ignoring the probe response message if it indicates that the responding device is not a wireless device that is in an operation mode for setting up an ad hoc network; and
   determining which device will initiate ad hoc network communication between the devices.

6. The method of claim 5, further comprising:
   analyzing information in the probe response and comparing it to information regarding the first wireless device if the probe response includes an indication that the responding device is a wireless device that is in an operation mode for setting up an ad hoc network; and
   determining whether the first device or the responding device will start a new network for communication between the first and responding devices.

7. The method of claim 5, wherein the indication includes adding a predefined value as ad hoc network identifier.

8. An apparatus, comprising:
   a transceiver in the apparatus that is in an operation mode for setting up an ad hoc network, configured to receive a wireless probe request message from another device;
   a processor in the apparatus, configured to determine whether the another device is actively setting up an ad hoc network based on an indication included in the received probe request message;
   said processor further configured to ignore the probe request message if the another device is not actively setting up an ad hoc network; and
   said transceiver further configured to respond to the probe request message by transmitting a probe response message if the another device is actively setting up an ad hoc network, as indicated by the indication in the probe request message, to enable the apparatus and the another device to determine which device will initiate ad hoc network communication between the devices.

9. The apparatus of claim 8, further comprising:
   said transceiver further configured to transmit a wireless probe response message to the another device; and
   said processor further configured to indicate in the probe response message that it is from a responding wireless device that is in an operation mode for setting up an ad hoc network, based on an indication included in the probe response message.

10. The apparatus of claim 9, wherein the indicating includes adding a predefined value as an ad hoc network identifier.

11. The apparatus of claim 8, further comprising:
    said processor further configured to analyze information of the received probe request message and compare it to information regarding the apparatus; and
    said processor further configured to determine whether the another device or the apparatus will start a new network for initiating ad hoc network communication between the another device and the apparatus.

12. An apparatus, comprising:
    a transceiver configured to transmit a wireless probe request message indicating the apparatus is actively setting up an ad hoc network, based on an indication included in the probe request message;
    said transceiver further configured to receive a wireless probe response from a responding device;
    a processor in the apparatus, configured to determine whether the responding device is actively setting up an ad hoc network based on an indication included in the received probe response;
    said processor further configured to ignore the probe response if it indicates that the responding device is not a wireless device that is in an operation mode for setting up an ad hoc network; and said processor further configured to determine which device will initiate ad hoc network communication between the devices.

13. The apparatus of claim 12, further comprising:
said processor further configured to analyze information in the probe response and comparing it to information regarding the apparatus if the probe response includes an indication that the responding device is a wireless device that is in an operation mode for setting up an ad hoc network; and
said processor further configured to determine whether the apparatus or the responding device will start a new network for communication between the apparatus and the responding device.

14. The apparatus of claim 12, wherein the indication includes adding a predefined value as ad hoc network identifier.

15. A non-transitory computer readable medium configured to store program instructions, which when executed by a computer processor, perform the steps of:
receiving, at a wireless device that is in an operation mode for setting up an ad hoc network, a wireless probe request message from another device;
determining whether the another device is actively setting up an ad hoc network based on an indication included in the received probe request message;
ignoring the probe request message if the other device is not actively setting up an ad hoc network; and
responding to the probe request message by transmitting a probe response message if the other device is actively setting up an ad hoc network, as indicated by the indication in the probe request message, to enable the wireless device and the another device to determine which device will initiate ad hoc network communication between the devices.

16. The non-transitory computer readable medium of claim 15, further comprising program instructions, which when executed by a computer processor, perform the step of:
indicating in the probe response message that it is from a responding wireless device that is in an operation mode for setting up an ad hoc network, based on an indication included in the probe response message.

17. The non-transitory computer readable medium of claim 16, wherein the indicating includes adding a predefined value as an ad hoc network identifier.

18. The non-transitory computer readable medium of claim 15, further comprising program instructions, which when executed by a computer processor, perform the steps of:
analyzing, at the wireless device, information of the received probe request message and comparing it to information regarding the wireless device; and
determining whether the another device or the wireless device will start a new network for initiating ad hoc network communication between the devices.

19. A non-transitory computer readable medium configured to store program instructions, which when executed by a computer processor, perform the steps of:
transmitting, by a first wireless device, a wireless probe request message indicating the transmitting device is actively setting up an ad hoc network, based on an indication included in the probe request message;
receiving a wireless probe response from a responding device;
determining whether the responding device is actively setting up an ad hoc network based on an indication included in the received probe response message;
ignoring the probe response if it indicates that the responding device is not a wireless device that is in an operation mode for setting up an ad hoc network; and
determining which device will initiate ad hoc network communication between the devices.

20. The non-transitory computer readable medium of claim 19, further comprising program instructions, which when executed by a computer processor, perform the steps of:
analyzing information in the probe response and comparing it to information regarding the first wireless device if the probe response includes an indication that the responding device is a wireless device that is in an operation mode for setting up an ad hoc network; and
determining whether the first device or the responding device will start a new network for communication between the first and responding devices.

21. The non-transitory computer readable medium of claim 19, wherein the indication includes adding a predefined value as ad hoc network identifier.

* * * * *